United States Patent
Lee

(10) Patent No.: US 8,835,344 B2
(45) Date of Patent: Sep. 16, 2014

(54) FUEL CELL ELECTRODE AND METHOD FOR MANUFACTURING MEMBRANE-ELECTRODE ASSEMBLY USING THE SAME

(75) Inventor: Jae Seung Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 730 days.

(21) Appl. No.: 13/101,623

(22) Filed: May 5, 2011

(65) Prior Publication Data

US 2012/0141919 A1    Jun. 7, 2012

(30) Foreign Application Priority Data

Dec. 2, 2010    (KR) .................... 10-2010-0122013

(51) Int. Cl.
| | |
|---|---|
| *H01M 4/92* | (2006.01) |
| *H01M 8/10* | (2006.01) |
| *H01M 4/38* | (2006.01) |
| *H01M 4/88* | (2006.01) |
| *H01M 4/86* | (2006.01) |

(52) U.S. Cl.
CPC ............ *H01M 8/1004* (2013.01); *Y02E 60/521* (2013.01); *H01M 4/926* (2013.01); *H01M 4/8896* (2013.01); *H01M 4/8814* (2013.01); *H01M 4/8882* (2013.01); *H01M 4/8828* (2013.01); *H01M 4/8663* (2013.01)
USPC ............ 502/101; 429/483; 429/487; 429/485

(58) Field of Classification Search
CPC . H01M 4/926; H01M 4/8896; H01M 4/8814; H01M 8/1004; H01M 4/8882; H01M 4/8828; H01M 4/8663
USPC ................... 502/101; 429/235, 483, 487, 485
See application file for complete search history.

(56) References Cited

U.S. PATENT DOCUMENTS

| | | | |
|---|---|---|---|
| 2004/0115515 A1 | 6/2004 | Ueda et al. | |
| 2010/0210454 A1 | 8/2010 | Epshteyn et al. | |

FOREIGN PATENT DOCUMENTS

| | | |
|---|---|---|
| JP | 2004146223 A | 5/2004 |
| KR | 1020060039404 | 5/2006 |
| KR | 1020070011158 | 1/2007 |

*Primary Examiner* — Helen O Conley
(74) *Attorney, Agent, or Firm* — Edwards Wildman Palmer LLP; Peter F. Corless

(57) ABSTRACT

The present invention provides a fuel cell electrode, which has increased physical and chemical durability, and a method for manufacturing a membrane-electrode assembly (MEA) using the same. According to the present invention, the fuel cell electrode is manufactured by controlling the amount of platinum supported on a first carbon support used in an anode to be smaller than that used in a cathode to increase the mechanical strength of a catalyst layer and maintain the thickness of the catalyst layer after prolonged operation and by adding carbon nanofibers containing a radical scavenger to a catalyst slurry to decrease deterioration of chemical durability.

3 Claims, 6 Drawing Sheets

FUEL CELL ELECTRODE AND METHOD FOR MANUFACTURING MEMBRANE-ELECTRODE ASSEMBLY USING THE SAME

CROSS-REFERENCE TO RELATED APPLICATION

This application claims under 35 U.S.C. §119(a) the benefit of Korean Patent Application No. 10-2010-0122013 filed Dec. 2, 2010, the entire contents of which are incorporated herein by reference.

BACKGROUND (a) Technical Field

The present invention relates to a fuel cell electrode and a method for manufacturing a membrane-electrode assembly (MEA) using the same. More particularly, it relates to a fuel cell electrode, which has increased physical and chemical durability, and a method for manufacturing a membrane-electrode assembly (MEA) using the same.

(b) Background Art

A fuel cell stack, which substantially generates electricity in a fuel cell system, typically has a structure in which several tens to several hundreds of unit cells, each comprising a membrane-electrode assembly (MEA) and a separator, are stacked together. The MEA usually is made up of a polymer electrolyte membrane, a negative electrode and a positive electrode, which are disposed on each of both sides of the polymer electrolyte membrane. The negative electrode (also known as a "hydrogen electrode", "fuel electrode", "anode", or "oxidizing electrode) and the positive electrode (also known as an "air electrode", "oxygen electrode", "cathode", or "reducing electrode") are configured in such a manner that a catalyst layer which has platinum catalyst nanoparticles is formed on an electrode backing layer (e.g., carbon paper or carbon cloth).

Conventional methods for manufacturing membrane-electrode assemblies will be described below. As shown in FIG. 1, a catalyst slurry is coated, sprayed or painted on a gas diffusion layer to form an electrode, and the electrode is bonded to a polymer electrode membrane by thermal compression. Alternatively, as shown in FIG. 2, a catalyst slurry is coated, sprayed or painted directly on a polymer membrane and the resulting polymer membrane is bonded to a gas diffusion layer. As yet another method, as shown in FIG. 3, a catalyst slurry is coated, sprayed or painted on a release paper and transferred to a polymer membrane to form an electrode, and the electrode is bonded to a gas diffusion layer.

However, although applying the catalyst slurry on the gas diffusion layer advantageously forms pores, the associated manufacturing process is inconvenient, and thus it is not used in a commercial process.

Moreover, the method of directly forming the catalyst layer on the polymer membrane can manufacture small area electrodes but has difficulties in manufacturing large area electrodes due to deformation of the polymer membrane.

Furthermore, in the case of the method of forming the catalyst layer on the release paper and transferring the catalyst layer to the polymer membrane, the catalyst layer may be cracked according to the thickness of the catalyst layer, the content of a binder, and the type of the catalyst. Therefore, the catalyst layer may be lost during transfer to the polymer membrane. Moreover, after the catalyst layer is transferred to the polymer membrane, cracks may form in the catalyst layer thereby directly exposing the polymer membrane to a gas supply channel of the separator via the cracks, thus deteriorating the performance and durability of the fuel cell.

Another factor that deteriorates the durability of the manufactured MEAs is that the polymer electrolyte membrane is broken down due to chemical instability, which occurs in both operation and idle states of the fuel cell. More specifically, the breakdown of the polymer electrolyte membrane is directly caused by hydroxyl radicals (OH radicals) generated by hydrogen peroxide produced when oxygen or hydrogen permeates through the polymer membrane and by hydrogen peroxide produced during the reaction at the oxygen electrode. The thus generated hydroxyl radicals break down the functional group (e.g., —$SO_3H$) at an end of the polymer electrolyte (binder) to deteriorate the conductivity of hydrogen ions, thereby deteriorating the performance of the fuel cell.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell electrode, which is manufactured by controlling the amount of platinum supported on a carbon support in an anode catalyst to be smaller than that in a cathode catalyst to increase the mechanical strength of a catalyst layer and maintain the thickness of the catalyst layer after a prolonged time of operation and by adding carbon nanofibers containing cerium-zirconium oxide ($CeZrO_4$) as a radical scavenger to a catalyst slurry to prevent deterioration of chemical durability.

In one embodiment of the present invention, the fuel cell electrode of the present invention utilizes about 20 to about 120 parts by weight of a polymer electrolyte binder having hydrogen ion conductivity and about 1 to about 80 parts by weight of carbon nanofibers containing a radical scavenger relative to about 100 parts by weight of an anode catalyst and relative to about 100 parts by weight of a cathode catalyst, respectively. The anode catalyst contains platinum supported on a carbon support in an amount of about 1 to about 40 wt % relative to the total amount of the platinum and carbon support, and the cathode catalyst contains platinum supported on a carbon support in an amount of about 40 to about 80 wt % relative to the total amount of the platinum and carbon support.

In some embodiments, the radical scavenger is cerium-zirconium oxide and is added in an amount of about 1 to about 100 parts by weight relative to about 100 parts by weight of the carbon nanofibers.

Also in some embodiments, the carbon support of the catalyst layer can be either carbon powder, carbon black, acetylene black, Ketjen black, activated carbon, carbon nanotubes, carbon fibers, carbon nanowires, carbon nanohorns, carbon aerosol, carbon aerogel, carbon nanorings, and mixtures thereof.

In still another embodiment, the carbon nanofibers can be carbon nanotubes, carbon nanowires, carbon nanohorns, carbon nanorings, and mixtures thereof, which have a diameter of about 5 to about 100 nm.

In yet another embodiment, the radical scavenger may be made up of nanoparticles having an average particle size of about 1 to about 20 nm and may also be added to the carbon nanofibers. These radical scavengers can be cerium oxide, zirconium oxide, manganese oxide, aluminum oxide, vanadium oxide, and/or mixtures thereof.

In another aspect, the present invention provides a method for manufacturing a membrane-electrode assembly. Initially, a catalyst slurry is prepared for forming a fuel cell electrode. Then about 1 to about 80 parts by weight of carbon nanofibers containing a radical scavenger relative to about 100 parts by weight of an anode catalyst containing platinum supported on a carbon support in an amount of about 1 to about 40 wt % and relative to about 100 parts by weight of a cathode catalyst containing platinum supported on a carbon support in an amount of about 40 to about 80 wt % are added to the catalyst slurry. In this step, the carbon nanofibers containing the radical scavenger are added in the form of a slurry by a machine process. Next, the resulting mixture is stirred to obtain a final catalyst slurry. The final catalyst slurry is then coated on a release paper to form an electrode and the electrode is dried accordingly. The dried electrode is then bonded to a polymer membrane by thermal compression and the release paper is removed, thus obtaining the desired membrane-electrode assembly.

In some embodiments, the method mills the catalyst slurry using, e.g., a planetary bead mill, so that the catalyst has a smaller and a more uniform particle size.

In another embodiment, the final catalyst slurry may have a solid content of about 5 to about 30 wt % as the total weight of the catalyst, ionomer, carbon nanofibers, and cerium-zirconium oxide as the radical scavenger.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
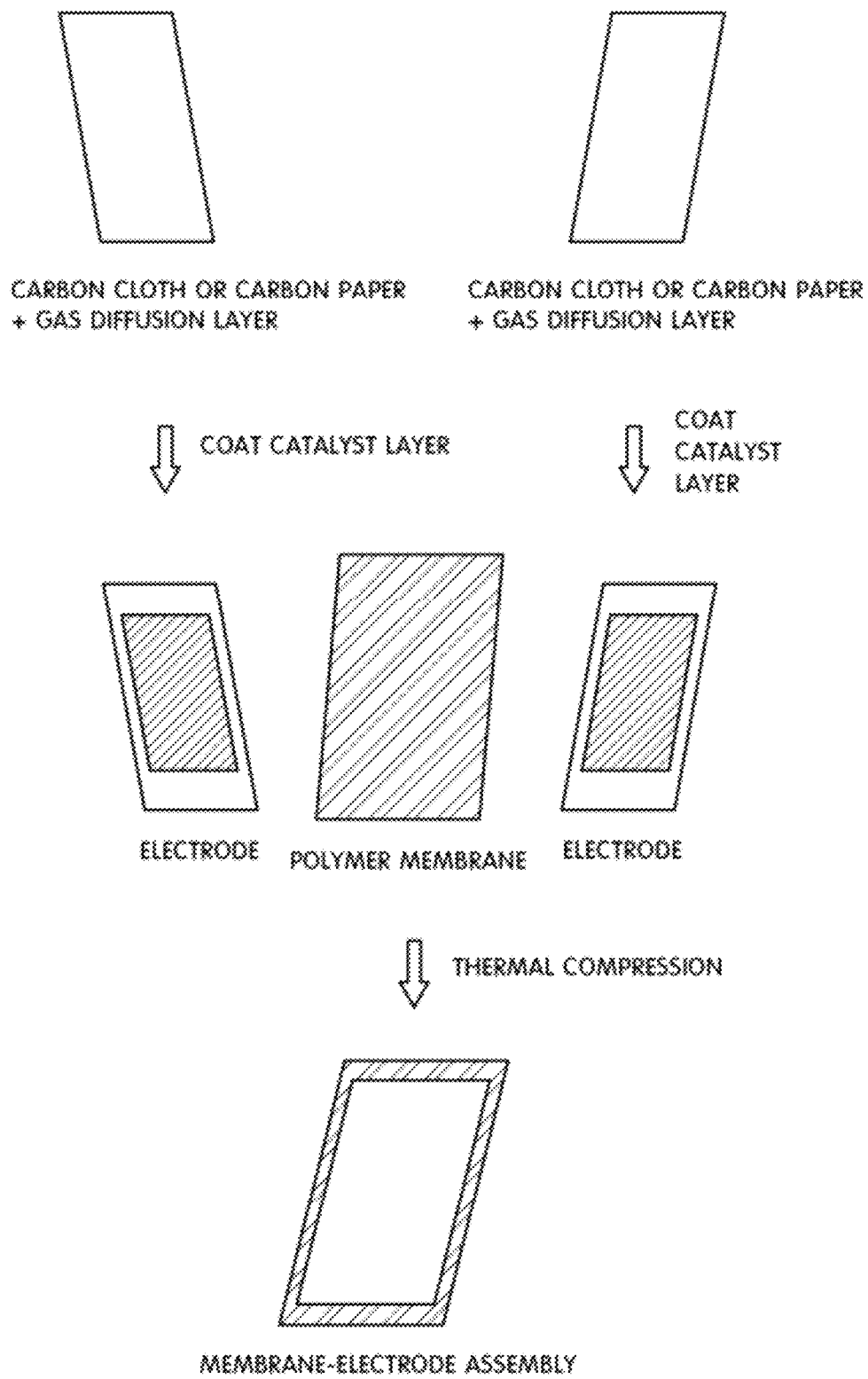
FIG. 1 is a schematic diagram showing a method for manufacturing a membrane-electrode assembly by coating a catalyst layer on a gas diffusion layer to form an electrode and bonding the electrode to a polymer membrane by thermal compression.
Figure 2:
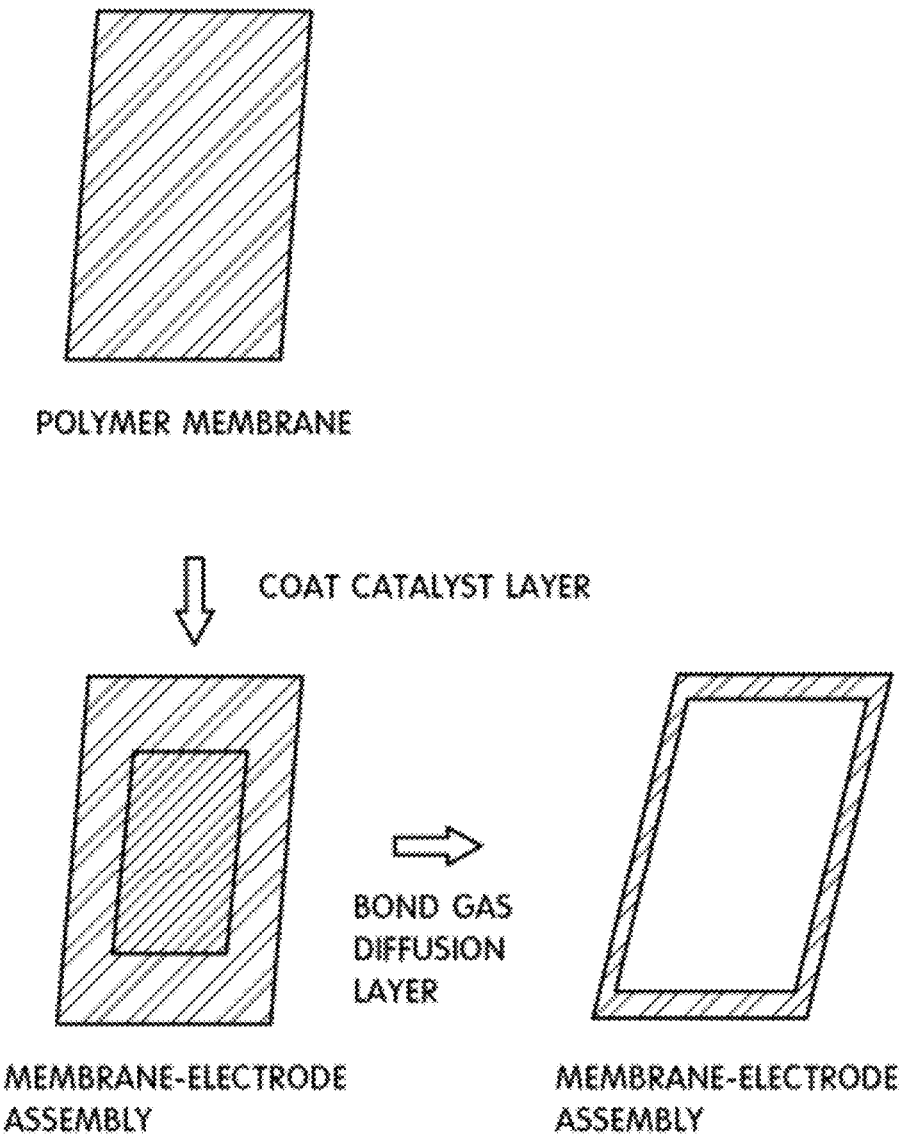
FIG. 2 is a schematic diagram showing a method for manufacturing a membrane-electrode assembly by coating a catalyst layer directly on a polymer membrane and bonding the polymer membrane to a gas diffusion layer.
Figure 3:
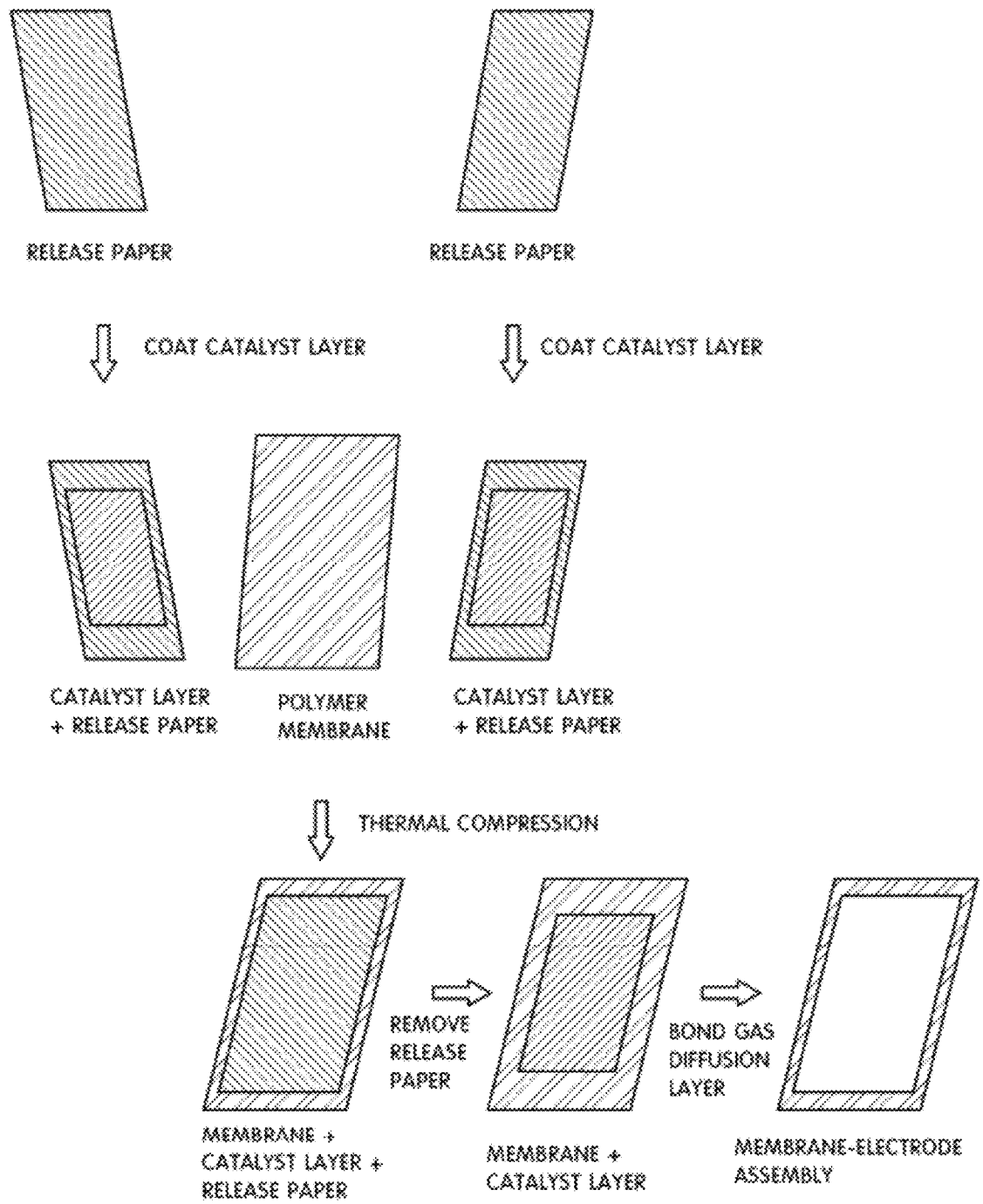
FIG. 3 is a schematic diagram showing a method for manufacturing a membrane-electrode assembly by coating a catalyst layer on a release paper, transferring the catalyst layer on the release paper to a polymer membrane, and bonding the polymer membrane to a gas diffusion layer.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Typically, fuel cell electrodes, such as an anode to which hydrogen is supplied and a cathode to which oxygen in air is supplied, are formed of the same composition. However, the reactions occurring at both electrodes are different, the reaction rates and the movements of products are different, and the mechanisms of deterioration are different. Therefore, it is necessary to configure the electrodes to be adapted to respective purpose, instead of using the same electrodes for all purposes.

In view of the foregoing, according to a first feature of the present invention, platinum for an anode catalyst is used in an amount of about 1 to about 40 wt % to reduce the effect of carbon corrosion occurring in an anode and reduce the amount of platinum used. More specifically, the amount of platinum for a cathode catalyst used is about 40 to about 80 wt %.

That is, when the amount of platinum used in the anode catalyst is smaller than that in the cathode catalyst, it is possible to maintain the thickness of a catalyst layer at a higher level while manufacturing the electrodes with the use of a smaller amount of platinum. Thus, the initial electrode coating process can be easily performed, and it is possible to also prevent the catalyst layer from being lost even when deterioration of the catalyst layer occurs during long-term operation.

According to the present invention, a catalyst slurry is prepared by adding carbon nanofibers so that the bonding of the catalyst layer is strongly maintained, in which a radical scavenger is added to the carbon nanofibers to manufacture a membrane-electrode assembly for a fuel cell having excellent chemical durability.

Here, when the radical scavenger is added to the carbon nanofibers, it is possible to prevent the radical scavenger from being lost from the catalyst layer and provide the carbon nanofibers having a smaller particle size, and thus the utilization of the radical scavenger can be significantly improved.

More specifically, the fuel cell electrode according to the present invention is prepared by adding about 20 to about 120 parts by weight of a polymer electrolyte binder having hydrogen ion conductivity and about 1 to about 80 parts by weight of carbon nanofibers containing a radical scavenger relative to about 100 parts by weight of an anode catalyst, in which platinum is supported in an amount of about 1 to about 40 wt %, and relative to about 100 parts by weight of a cathode catalyst, in which platinum is supported in an amount of about 40 to about 80 wt %, In particular, the radical scavenger is added in an amount of about 1 to about 100 parts by weight relative to about 100 parts by weight of the carbon nanofibers. The fuel cell electrodes such as the anode and cathode are composed of platinum and carbon, and their thickness and volume are determined by the amount of carbon.

In the present invention, platinum is supported in the anode catalyst in an amount of about 1 to about 40 wt % to reduce the effect of carbon corrosion occurring in the anode and reduce the amount of platinum and platinum is supported in the cathode catalyst in an amount of about 40 to about 80 wt %. Here, even when a platinum alloy is used instead of platinum, the same amount of platinum is supported.

Therefore, the amount of platinum supported in the anode catalyst is reduced to about 1 to about 40 wt % with respect to catalyst (or relative to the total amount of the platinum and carbon support), and thus the amount of platinum used can be reduced. Moreover, the amount of carbon is increased with respect to the amount of platinum, and thus the thickness of the anode catalyst can be maintained at a higher level, thereby preventing the catalyst layer from being lost even when deterioration of the catalyst layer occurs during long-term operation.

Meanwhile, carbon nanofibers having the same mechanical properties can be used regardless of their types and, for example, carbon nanotubes, carbon nanowires, carbon nanohorns, carbon nanorings can be used. While various structures of the carbon nanofibers can be used, carbon nanofibers having a high degree of straightness in the longitudinal direction may also provide good effects.

In some embodiments of the present invention, the carbon nanofibers may have a diameter of about 5 to about 100 nm and a length of several hundreds of nanometers. If the diameter of the carbon nanofibers is, for example, 5 nm or less, it is difficult to disperse the carbon nanofibers, and the carbon nanofibers tend to agglomerate after dispersion, thereby causing non-uniformity of catalyst slurry. Whereas, if the diameter is 100 nm or greater, the ability to bond the catalyst layer is reduced, and the carbon nanofibers may cause physical damage to the catalyst layer. Therefore, it is preferable that carbon nanofibers having a diameter of about 5 to about 100 nm be used.

For reference, unlike the use of the carbon nanofibers having a diameter of about 5 to about 100 nm for the bonding of the catalyst layer according to the present invention, when existing carbon nanofibers are used in the catalyst layer of the fuel cell electrode, carbon nanofibers having a diameter of about 100 nm or greater are conventionally used to form pores in the catalyst layer.

According to a second feature of the present invention, cerium-zirconium oxide ($CeZrO_4$) as a radical scavenger (inhibitor) capable of inhibiting the formation of hydroxyl radicals is added to decrease deterioration of chemical durability of the fuel cell electrode. When the cerium-zirconium oxide as a radical inhibitor is added to the fuel electrode or air electrode together with the carbon nanofibers, hydrogen peroxide produced in the electrodes is decomposed into water molecules to inhibit the formation of hydroxyl radicals, thereby inhibiting the decomposition of the polymer electrolyte.

Typically, materials used as the radical inhibitors in the field of biochemistry include cerium oxide, zirconium oxide, manganese oxide, aluminum oxide, vanadium oxide, and mixtures thereof. To apply these radical inhibitors, i.e., the oxides used as the radical scavenger, to the fuel cell, an oxide is formed into nanoparticles having an average particle size of about 2 to about 60 nm and the nanoparticles are added to the catalyst layer to inhibit the formation of radicals and improve the chemical stability of the electrode and the polymer membrane. However, the operating conditions of the fuel cell are severe due to, for example, high temperatures, high potentials, etc., and thus the durability of the nanoparticles may be significantly reduced.

Cerium-zirconium oxide is used in the present invention as the radical inhibitor to physically stabilize the nanoparticles. The reason for this is that when cerium is mixed with zirconium to form the cerium-zirconium oxide, the thermal stability of cerium nanoparticles is significantly improved, and thus the deformation and agglomeration of nanoparticles are reduced even under the severe conditions of the fuel cell.

Next, the configuration of the fuel cell electrode according to an embodiment of the present invention will be described in detail.

Figure 4:
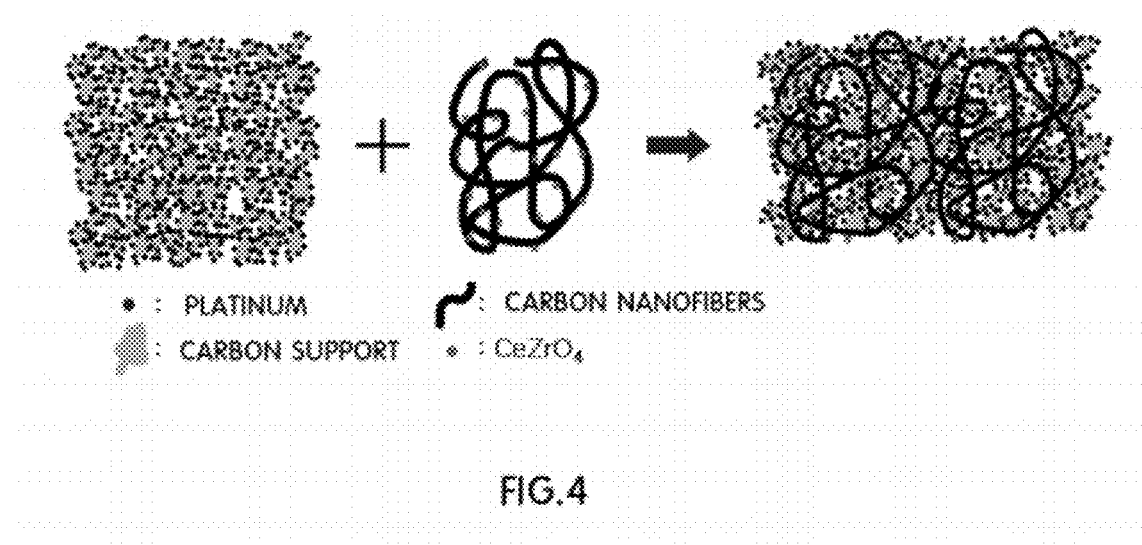
FIG. 4 is a schematic diagram showing the structure of a fuel cell electrode in accordance with an exemplary embodiment of the present invention.

As shown in FIG. 4, the fuel cell electrode of the present invention is prepared by adding about 20 to about 120 parts by weight of a polymer electrolyte binder having hydrogen ion conductivity and about 1 to about 80 parts by weight of carbon nanofibers containing cerium-zirconium oxide as a radical scavenger relative to about 100 parts by weight of an anode catalyst, in which platinum is supported in an amount of about 1 to about 40 wt %, and a cathode catalyst in which platinum is supported in an amount of about 40 to about 80 wt %, respectively. In particular, the radical scavenger is added in an amount of about 1 to about 100 parts by weight relative to about 100 parts by weight of the carbon nanofibers.

As mentioned above, the carbon nanofibers may be carbon nanotubes, carbon nanowires, carbon nanohorns, carbon nanorings, and/or mixtures thereof, which have a diameter of about 5 to about 100 nm. The reason is that if the diameter of the carbon nanofibers is 5 nm or less, it is difficult to disperse the carbon nanofibers, and the carbon nanofibers tend to agglomerate after dispersion, thereby causing non-uniformity of catalyst slurry. Whereas, if the diameter is 100 nm or greater, the ability to bond the catalyst layer is reduced, and the carbon nanofibers may cause physical damage to the catalyst layer.

Moreover, if the amount of carbon nanofibers containing a radical scavenger is about 1 part by weight or less relative to about 100 parts by weight of the catalyst, the bonding of the catalyst layer is not achieved. Whereas, if the amount of carbon nanofibers is 80 parts by weight or greater, the carbon nanofibers disturb the mass transfer to block the flow of reactant gases, which deteriorates the performance of the fuel cell, and the amount of binder required is thereby increased, which in turn causes unnecessary loss. Therefore, in the illustrative embodiment of the present invention, the amount of carbon nanofibers are limited to about 1 to about 80 parts by weight.

More specifically, the radical scavenger may be cerium oxide, zirconium oxide, manganese oxide, aluminum oxide, vanadium oxide, and/or mixtures thereof. Cerium-zirconium oxide improves the thermal stability of cerium nanoparticles and thus the deformation and agglomeration of nanoparticles are reduced even under severe conditions.

Next, a method for manufacturing a membrane-electrode assembly using the above-described fuel cell electrode of the present invention will be described in more detail.

First, to prepare a fuel cell electrode of the present invention, a catalyst slurry is prepared by mixing a carbon-supported catalyst, a polymer electrolyte (e.g., about 20 to about 120 parts by weight relative to about 100 parts by weight of the catalyst (cathode and anode catalyst, respectively), and a solvent (e.g., selected from the group consisting of water, alcohol, and a mixture thereof). Then, about 1 to about 80 parts by weight of carbon nanofibers containing a radical scavenger are added to the catalyst slurry relative to about 100 parts by weight of an anode catalyst, in which platinum is supported in an amount of about 1 to about 40 wt %, and relative to about 100 parts by weight of a cathode catalyst, in which platinum is supported in an amount of about 40 to about 80 wt %, respectively, and the resulting mixture is stirred to obtain a final catalyst slurry.

Here, carbon nanotubes, as the carbon nanofibers, are added in an amount of about 1 to about 60 parts by weight relative to about 100 parts by weight of the catalyst, and cerium-zirconium oxide as the radical scavenger is added in an amount of about 1 to about 100 parts by weight relative to about 100 parts by weight of the carbon nanotubes. The catalyst slurry obtained in the above manner may also be subjected to a milling process using, e.g., a planetary bead mill, such that the catalyst has a small and uniform particle size.

The final catalyst slurry may have a solid content of about 5 to about 30 wt % (the total weight of the catalyst, ionomer, carbon nanofibers, and cerium-zirconium oxide as the radical scavenger) so that the final catalyst slurry has a proper viscosity and is well compressed during manufacturing of the membrane-electrode assembly.

Then, the final catalyst slurry is coated on a release paper to form an electrode and the electrode is dried at about 30 to about 130° C. Then, the dried electrode is to bonded to a polymer membrane by thermal compression, thus obtaining a membrane-electrode assembly (MEA).

In more detail, the dried electrode is positioned at both ends of the polymer membrane and subjected to thermal compression, thus manufacturing the MEA. At this time, the thermal compression is performed at a temperature of about 100 to about 180° C. and a pressure of about 50 to about 300 kgf for about 0.5 to 30 minutes. After the thermal compression, the release paper is removed to obtain the final MEA.

Next, the present invention will be described in detail with reference to examples, but the present invention is not limited to the following examples.

Examples 1 and 2

In Example 1, a final catalyst slurry was prepared in the above manner using an anode catalyst in which platinum is supported in an amount of 10 wt %, the final catalyst slurry was coated on a release paper to form an electrode, and the electrode was dried and then bonded to a polymer membrane by thermal compression, thus obtaining a membrane-electrode assembly.

In Example 2, a final catalyst slurry was prepared in the above manner using an anode catalyst in which platinum is supported in an amount of 20 wt %, the final catalyst slurry was coated on a release paper to form an electrode, and the electrode was dried and then bonded to a polymer membrane by thermal compression, thus obtaining a membrane-electrode assembly.

Test Examples 1 and 2

In Test Example 1, the thicknesses of the electrodes prepared in Examples 1 and 2 and the thickness of a conventional electrode having a large amount of platinum were measured with respect to the amount of platinum loaded and, in Test Example 2, the current densities of the electrodes were measured to evaluate the durability. The test results are shown in FIGS. 5 and 6.

Figure 5:
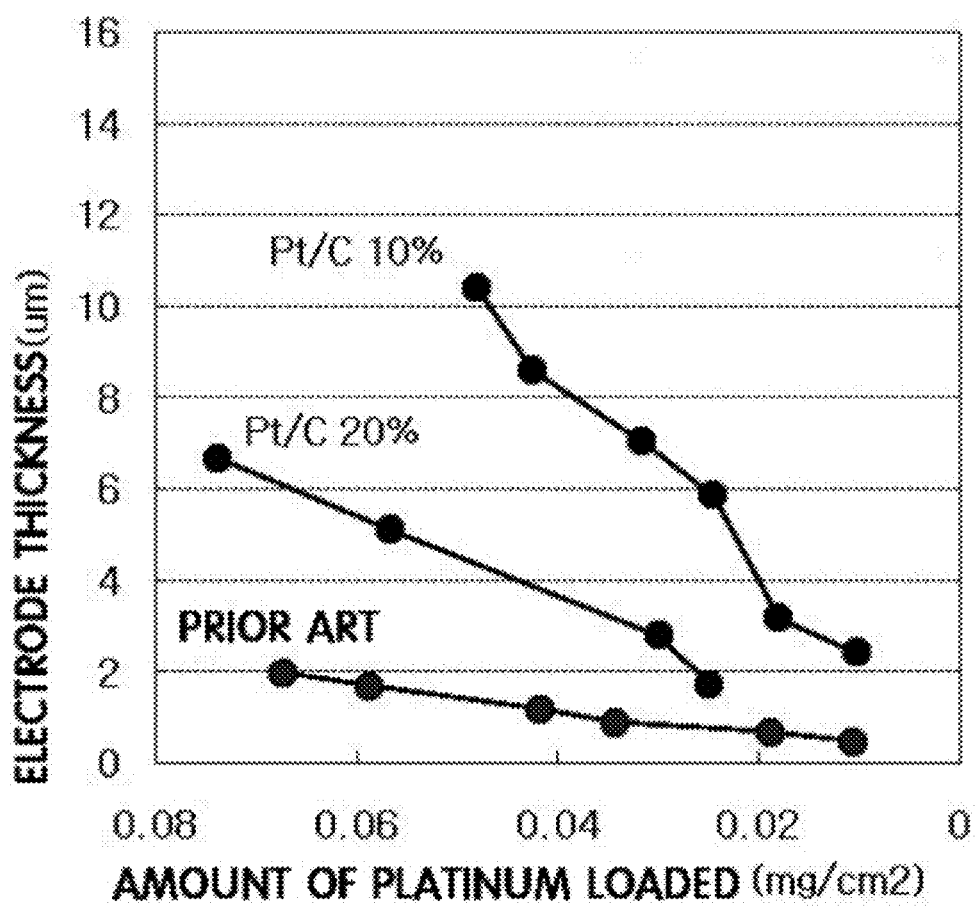
FIGS. 5 and 6 are graphs showing the test results of fuel cell electrodes manufactured by a method of the present invention and those manufactured by prior art methods.
Figure 6:
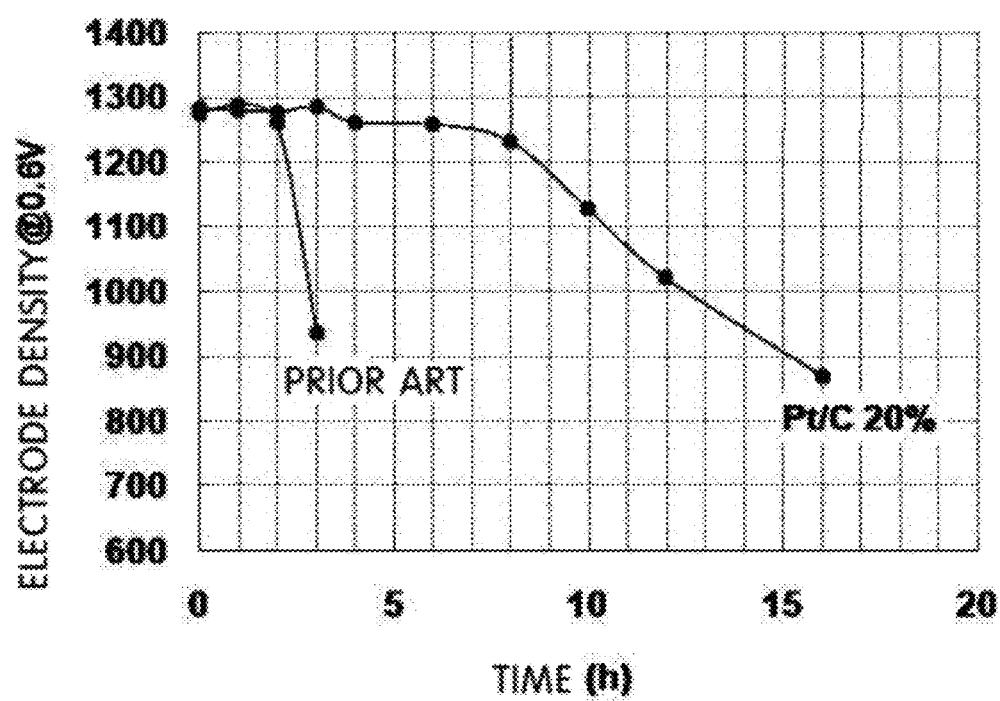

As shown in FIG. 5, it can be seen that the anode, i.e., the catalyst layer in which platinum was supported in an amount of 10 wt % has the greatest thickness. Moreover, as shown in FIG. 6, in the case of the anode catalyst, the current density with respect to time was not rapidly reduced, and thus the performance of the fuel cell was maintained.

Advantageously, since the membrane-electrode assembly is manufactured by controlling the amount of platinum supported on a carbon support used in the anode to be smaller than that used in the cathode catalyst and adding carbon nanofibers containing a radical scavenger to a catalyst slurry, it is possible to improve the physical and chemical stabilization of the membrane-electrode assembly, thereby improving the performance and durability of the fuel cell. Moreover, it is possible to prevent the catalyst layer from being lost and maintain the thickness of the catalyst layer after a long time operation, thus minimizing the deterioration of performance of the fuel cell.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a membrane-electrode assembly, the method comprising:
   preparing a catalyst slurry for forming a fuel cell electrode;
   adding 1 to 80 parts by weight of carbon nanofibers containing a radical scavenger relative to 100 parts by weight of an anode catalyst containing platinum supported on a first carbon support in an amount of 1 to 40 wt % and a cathode catalyst containing platinum supported on a second carbon support in an amount of 40 to 80 wt % to the catalyst slurry, the carbon nanofibers containing the radical scavenger being added in the form of a slurry;
   stirring the resulting mixture to obtain a final catalyst slurry;
   coating the final catalyst slurry on a release paper to form an electrode;
   drying the electrode; and
   bonding the dried electrode to a polymer membrane by thermal compression and removing the release paper to obtain a membrane-electrode assembly.

2. The method of claim 1, further comprising milling the catalyst slurry using a planetary bead mill to allow the catalyst to have a smaller and more uniform particle size.

3. The method of claim 1, wherein the final catalyst slurry has a solid content of 5 to 30 wt % by weight as the total weight of catalyst, ionomer, carbon nanofibers, and cerium-zirconium oxide as the radical scavenger.

* * * * *